Oct. 15, 1968        E. S. NELSON        3,405,488
HOUSING FOR COVERING EXPOSED PIPE LENGTHS
Filed July 16, 1965
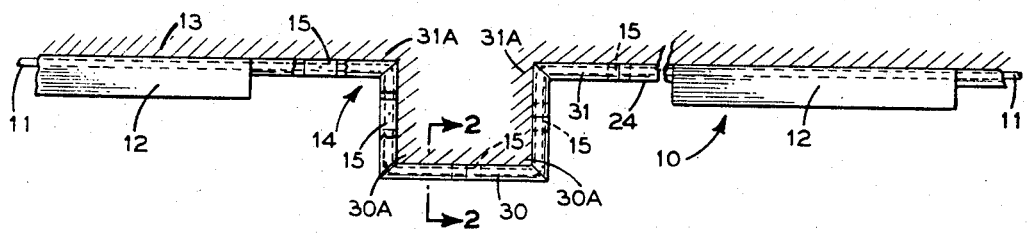
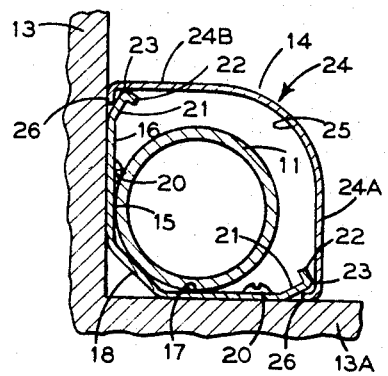
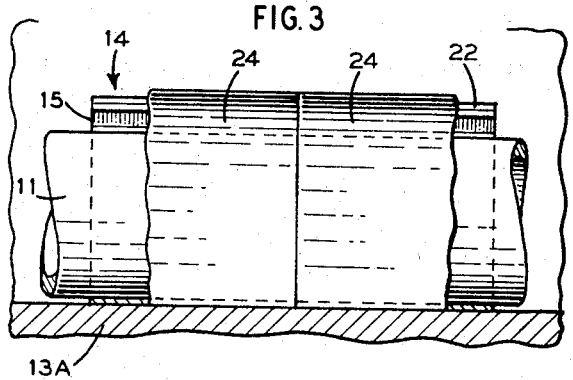
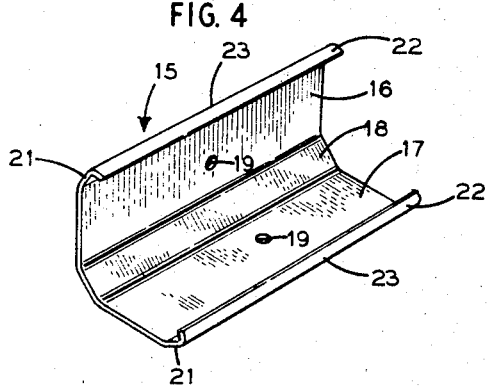
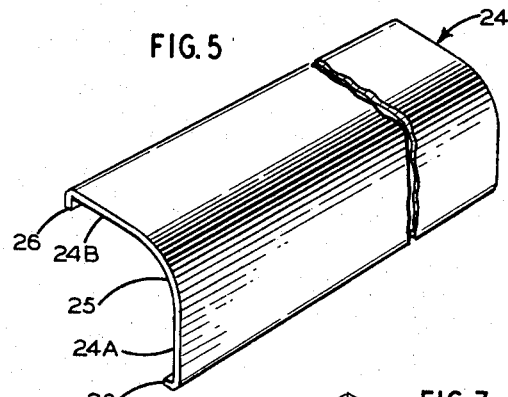
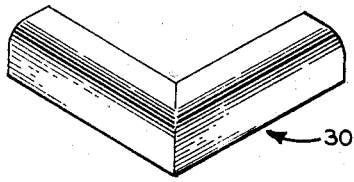
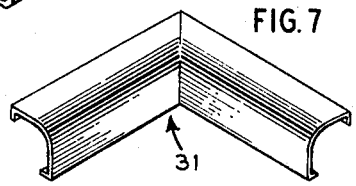
INVENTOR.
Elliot S. Nelson
BY
*Irving Seidman*
ATTORNEY

United States Patent Office 3,405,488
Patented Oct. 15, 1968

3,405,488
HOUSING FOR COVERING EXPOSED
PIPE LENGTHS
Elliot S. Nelson, Westbury, N.Y., assignor to Embassy Industry, Inc., Farmingdale, N.Y., a corporation of New York
Filed July 16, 1965, Ser. No. 472,601
1 Claim. (Cl. 52—287)

This invention relates in general to a housing for an exposed length of pipe; and more specifically to a housing or shield for covering an exposed length of pipe extending along a surface of a wall to conceal it from view.

Heretofore in homes and building utilizing e.g. a baseboard radiation type of heating unit, it frequently occurs that the fin tube or radiation unit does not have to extend along the entire length of an adjacent wall. Consequently, the pipe connecting or supplying such fin tube or radiation unit with a heating medium, as for example the hot water or steam, is frequently exposed. Such exposed pipes constitute an unsightly appearance. Also, since such pipes carry a hot heating medium, as for example hot water or steam, they can create a hazard in the event that a person may be burned if accidental contact is made therewith. For these reasons many efforts have been made to suitably shield or cover the exposed length of such pipes from view and/or to prohibit contact therewith.

Heretofore the covers or shields which have been utilized to shield or cover such pipes were relatively complicated and costly to manufacure and install. The cost of manufacturing and installing the prior known construction was further increased where the prior known covers followed an irregular lay of pipe.

It is, therefore, an object of this invention to provide a relatively simple constructed cover or shield that can be readily fabricated and which can be installed and maintained with relative ease.

It is another object of this invention to provide a cover or shield for protecting exposed lengths of pipe that can be readily removed and/or replaced with a minimum of effort and a maximum of ease without the use of any hand tools.

Still another object is to provide a shield or cover for exposed lengths of pipe that can be readily installed to follow any contour or lay of any exposed pipe length.

Still another object of this invention is to provide a shield or cover for an exposed length of pipe that is pleasing in appearance and which can readily blend in with the decor of the room through which such pipe runs.

Still another object of this invention is to provide a shield or cover for an exposed length of pipe which can be readily attached or detached in a manner so as to enable a housewife to facilitate the cleaning in and around the exposed pipe length.

The foregoing objects and other features and advantages are attained by a pipe houing or shield for covering an exposed length of pipe that runs along the surface of the wall that comprises essentially of a bracket which is adapted to be located at predetermined spaced intervals along the length of the exposed pipe, and an elongated housing or cover extending between one or more of such spaced brackets to provide a cover or shield for a corresponding length of pipe. Accordingly, each bracket comprises a member having angularly disposed leg portions to receive therebetween the circumference of a pipe to be covered. The free ends of the respective leg portions are bent inwardly toward one another so that the free ends of the respective leg portions are spaced from an adjacent wall surface. Accordingly, a cover is frictionally secured to each of the brackets to define the shield or cover for a corresponding exposed length of pipe. The cover comprises an elongated member, and it includes angularly disposed leg portions having their respective free ends thereof inwardly bent to define a lip which is adapted to snap into engagement with the inwardly bent free ends of the bracket. The arrangement is such that the bracket and the cover member are formed of complementary resilient material so that the cover may be frictionally snapped into positive engagement with the leg portions of the bracket. The elongated cover may be constructed to define any standard shape or segment so that by joining a plurality of such cover sections in end to end relationship, extended length of pipe may be satisfactorily concealed.

A feature of this invention therefore resides in a relatively simple bracket and cover construction which are specifically arranged to render the cover frictionally engageable with the brackets spaced along the exposed length of pipe and readily detachably removable therefrom.

Still another object resides in the provision of a shield or housing for an exposed length of pipe which is positively secured by friction means only to the brackets spaced along the length of the pipe to be covered.

Another feature of this invention resides in the provision that the brackets and cover adapted to be supported thereon may both be formed either as a simple stamping and/or as an extruded member which may be cut to shape and size as may be required by a given installation.

Other features and advantages will become more readily apparent when considered in view of the drawings and specification in which:

FIGURE 1 illustrates a plan view of a baseboard radiation unit as installed against a wall surface in a particular installation in which the exposed pipe lengths are covered by a covering of the present invention.

FIGURE 2 is an enlarged sectional view taken along line 2—2 on FIGURE 1.

FIGURE 3 is an enlarged detail front view to illustrate the assembly of the abutting ends of the adjacent covers.

FIGURE 4 is an enlarged perspective view of the bracket member.

FIGURE 5 is a perspective view of an elongated cover member.

FIGURES 6 and 7 illustrate a right angle corner cover section adapted to cover exposed lengths of pipe located at a corner portion of a room or the like.

Referring to the drawings there is shown in FIGURE 1 a typical baseboard heating installation 10 in which the cover of the present invention is applied to the pipe lengths 11 supplying a heating medium to the radiation sections 12. However, while the invention is herein described and shown as applied to the exposed pipes of a heating arrangement 10, the invention may be applicable to any exposed pipe runs.

As shown in FIGURE 1, the baseboard heating radiation unit 12, depending upon the heating requirements or design conditions of a particular room or building need only to be of predetermined lengths. Generally, such radiation units 12 are connected by suitable piping 11 to a source of heating media, e.g. a boiler or the like, wherein the steam or hot water generated therein is circulated through the fin tube units 12. Because the radiation or fin tube section 12 is limited by design consideration it frequently happens that substantial lengths of the pipe or conduit 11 supplying the fin tube sections are required to run along the wall portion 13 of the room. Consequently, in accordance with this invention, an improved housing or cover structure 14 is provided to conceal the otherwise exposed length of supply pipes or conduits 11 from view, and in this manner enhance the aesthetic appearance of the baseboard radiation unit 10. Also, because the heating medium flowing through the pipes 11 is oftentimes extremely hot, the cover structure 14 further functions as a protector against burns in the event one's person comes into accidental contact with such pipes.

In accordance with this invention the cover or housing structure 14 is arranged to follow the contour of the exposed pipe lengths. Essentially the protective housing or covering structure 14 comprises a bracket 15 which may be spaced at predetermined intervals along the exposed length of pipe 11, as best seen in FIGURE 1. Referring more specifically to FIGURES 2 and 4, each bracket 15 comprises a member having a vertical leg portion 16 and a horizontal leg portion 17 which are interconnected at the juncture thereof by an inclined web portion 18. As best seen in FIGURE 2, the bracket 15 is disposed preferably along the base portion of a vertical wall 13 so that the respective vertical and horizontal leg portions 16, 17 thereof are located in abutment with the wall 13 and floor 13A. Accordingly, each of the respective leg portions 16, 17 is provided with an opening 19 through which a suitable fastener 20, as for example a nail or screw may be extended to firmly secure the bracket to the wall.

Referring to FIGURE 2, it will be noted that the respective free ends 21 of both the vertical leg portion and the horizontal leg portion 16, 17 are bent outwardly to space the free ends 21 thereof from the outer surface of the adjacent wall 13 and floor 13A. The tip end 22 of the respective vertical leg portions and horizontal leg portion 16, 17 are again angularly or reversely bent inwardly to define a rounded edge 23 extending longitudinally the length of the bracket 15. Accordingly, the rounded edge 23 is spaced from the adjacent surfaces 13 and 13A.

As noted in FIGURE 1, these brackets 15 are longitudinally spaced along the exposed length of a pipe so that the circumference of the pipe 11 is cradled between or in the angle defined by the respective leg portions 16 and 17. In the illustrated embodiment the respective leg portions 16, 17 and the interconnecting web portions 18 are each arranged tangent to the outer circumference of the pipe cradled therebetween. Accordingly, the sizing of the respective brackets 15 may be readily determined by the circumference of the pipe to be cradled therebetween. In this manner, standard dimensions for the brackets 15 can be determined depending upon the particular size of the pipe to be used therewith.

Referring to FIGURES 1, 2, and 5 it will be noted that an elongated shield or cover 24 is arranged to be frictionally secured to the free ends of the brackets 15. As shown, the housing or cover 24 comprises simply of an elongated angular member having a vertical leg portion 24A and a horizontal leg portion 24B. In the illustrated embodiment, the leg portions 24A, 24B of the cover 24 are interconnected by means of an arcuate section 25.

As best seen in FIGURES 2 and 5 the free ends of both the horizontal leg portion and vertical leg portions 24A, 24B of the housing or shield are bent at substantially right angles to the adjacent leg portion to define a lip 26. Accordingly, the sizes of the housing member 24 and the bracket 15 are such that the housing member 24 will frictionally snap into positive engagement over the rounded ends 23 of the bracket 15. For this reason the bracket and cover are formed of resilient material so that the free ends of the cover may flex sufficiently to override the rounded edge portions 23 of the bracket member 15. Accordingly, the rounded edges 23 of the bracket when engaged by the free end of the housing or cover will function as a cam in facilitating the spread of the respective leg portions 24A, 24B of the shield or cover member 24 so that the same may override and lock onto the bracket 15 by the inturned lip 26 of the cover member 24 occupying the space or angle defined by the bent end 21 portions of the bracket.

With the construction described it will be apparent that the respective elongated cover or shield members 24 can be readily attained in a minimum of effort and with a minimum of expense in that the installer merely has to space at predetermined intervals the bracket members 15 along the exposed length and then snap thereon the covers 24 to complete the installation.

FIGURES 6 and 7 illustrate a slightly modified shape 30 and 31 for a cover. FIGURE 6 is shaped to accommodate a 90° outside corner defined by a pipe as may be necessary when the pipe is required to follow a corner portion of a room or building as indicated at 30A in FIGURE 1. FIGURE 7 illustrates the shape of a cover for an inside corner as at 31A. It will be noted that such corner sections 30, 31 may be either formed as an integral unit, or may be defined by a pair of elongated cover sections which have their abutting end portions mitered so as to be fitted together to form the necessary corner.

In the event that the corner pieces are formed as an integral unit, the clips or brackets securing the same are disposed adjacent the outer ends of the corner section 30, 31. If the corner sections are formed of a pair of individual corner segments, then a 90° bracket (not shown) may be utilized at the juncture of the two adjacent cover sections. In all other respects the complementary end portions of the brackets and corner pieces are constructed as herein described.

From the foregoing it will be apparent that each of long the respective brackets or clips 15 need only be a few inches long and spaced at intervals, whereas the cover members 24, may be made in any desirable length and connected in end to end and abutting relationship.

Accordingly, the respective cover members 24 when installed may be disposed in end to end relationship to provide a cover for any exposed length of pipe.

It will be also understood that the respective covers may be formed to follow any run, bend, angle or length which the pipe may take depending upon the particular nature of the installation requirements.

While the instant invention has been described with reference to a particular embodiment, it will be readily appreciated and understood that variations and modifications may be made without departing from the scope or spirit of the invention.

What is claimed is:

1. A housing assembly for covering an exposed section of a pipe that runs along a corner portion defined by adjacent wall surfaces comprising:

a plurality of brackets connected to said corner defining wall surfaces at spaced intervals along the length of an exposed pipe extending along the corner portion defined by said adjacent wall surfaces, each of said brackets including an angular member having a vertical leg portion, a horizontal leg portion, an inclined web portion interconnecting said vertical and horizontal leg portions at the junction thereof whereby the section of said pipe to be covered is disposed in the angle defined by said bracket leg portions.

each of said vertical and horizontal leg portions and the interconnected inclined web portion each being disposed substantially tangent to the circumference of the pipe disposed in the angle of said bracket so that the sizing of a particular bracket may be readily determined by the circumference of the pipe adapted to be cradled therein, said vertical and horizontal leg portions each having their respective free end portions bent inwardly to define an acute angle with respect to the adjacent wall surface, said free ends of each leg portion being reversely bent to define a longitudinally extending rounded edge, and an extended cover adapted to snap over the rounded edges of said plurality of brackets, said cover including a member having angularly disposed leg portions adapted to shield said pipe section, the respective leg portions of said cover having their respective free end portions inwardly bent to snap over the rounded edges of said brackets, said brackets and cover being formed of complementary resilient material whereby said cover is frictionally snapped into positive engagement on said bracket, said cover being coextensive in length to the length of said exposed pipe section, and fastening means for securing the respective vertical and horizontal leg portion of said brackets to the adjacent wall surfaces.

References Cited

UNITED STATES PATENTS

| | | | |
|---|---|---|---|
| 1,173,398 | 2/1916 | Van Orden | 52—242 |
| 1,825,010 | 9/1931 | Murphy | 52—287 |
| 2,178,817 | 11/1939 | Small | 52—716 |
| 2,328,651 | 9/1943 | Kern | 52—288 |
| 3,074,521 | 1/1963 | Woods | 52—287 |

FOREIGN PATENTS

| | | |
|---|---|---|
| 221,618 | 11/1961 | Austria. |
| 599,459 | 7/1934 | Germany. |
| 248,056 | 5/1963 | Australia. |

FRANK L. ABBOTT, *Primary Examiner.*

JAMES L. RIDGILL, JR., *Assistant Examiner.*